United States Patent [11] 3,610,485

[72] Inventor Frederick F. Van Raden
 Hillsboro, Oreg.
[21] Appl. No. 18,472
[22] Filed Mar. 11, 1970
[45] Patented Oct. 5, 1971
[73] Assignee Peerless Trailer and Truck Service, Inc.
 Portland, Oreg.

[54] DUMPING-TYPE STORAGE BIN WITH MOVABLE INTERIOR BAFFLE
 5 Claims, 6 Drawing Figs.

[52] U.S. Cl. .................................................. 222/564,
 105/247, 214/41, 298/8 H, 298/35 M
[51] Int. Cl. ...................................................... A47f 1/02
[50] Field of Search............................................. 214/17 R,
 41; 222/564, 245, 247, 248; 105/247, 248, 251,
 253; 298/84, 35 M

[56] References Cited
 UNITED STATES PATENTS
 3,141,576 7/1964 Heise............................ 214/41 X
 3,319,807 5/1967 Van Raden.................... 214/41
 3,353,720 11/1967 Ricciardi....................... 222/248 X Primary Examiner—Gerald M. Forlenza
Assistant Examiner—Robert J. Spar
Attorney—Buckhorn, Blore, Klarquist & Sparkman ABSTRACT: A storage bin for wood chips or like products has sidewalls including a pair of opposite bottom walls which inwardly converge in the downward direction and are inclined to the horizontal at an angle substantially greater than the angle of repose of the product. Such bottom walls terminate short of their line of convergence to define a bottom opening in the bin. A gate is mounted below the opening to permit the product to discharge therethrough. A longitudinally extending interior baffle is positioned within the bin to divide the interior thereof into two longitudinally contiguous compartments. A hydraulic piston and cylinder position the lower portion of the baffle alternatively at least parallel to each of the inwardly converging bottom walls. When the baffle is in a position parallel to one of the bottom walls, a longitudinally extending interior compartment is formed with generally parallel sidewalls which compartment is readily emptied when the gate is opened. When the baffle is then rotated to a position at least parallel to the other bottom wall, the remaining portion of the product in the bin is readily discharged.

PATENTED OCT 5 1971

FREDERICK F. VAN RADEN
INVENTOR

BY
BUCKHORN, BLORE, KLARQUIST & SPARKMAN
ATTORNEYS

FREDERICK F. VAN RADEN
INVENTOR

BY
BUCKHORN, BLORE, KLARQUIST & SPARKMAN
ATTORNEYS

DUMPING-TYPE STORAGE BIN WITH MOVABLE INTERIOR BAFFLE

BACKGROUND OF THE INVENTION

This invention relates to a dumping-type storage bin or hopper and, more particularly, to such a bin for the temporary storage of wood chips or the like.

Waste wood products that have been reduced to chips, shavings, dust or similar products are desirably stored in bins or hoppers until they can be discharged therefrom into a truck or other conveyance for hauling to a location at which they can be utilized. A storage bin suitable for such use is disclosed in my U.S. Pat. No. 3,319,807. Such a bin includes a pair of inwardly converging bottom walls inclined to the horizontal at an angle substantially greater than the angle of repose of the product, thereby to permit the same readily to slide therealong and thence out the bottom of the bin. However, due to the nature of the product, a bridging thereof sometimes occurs across the bin between the inwardly converging bottom walls. When that happens, it is difficult to instigate movement of the product, necessitating probing or poking through the bottom or shaking of the bin, expedients which are unsafe and inefficient.

Accordingly, it is the primary object of the present invention to provide a dumping type of storage bin of the class described that will permit ready emptying of wood chips and like products therefrom.

It is a further object of the present invention to provide such a storage bin that will obviate any emptying difficulties that may arise due to the products bridging the interior thereof during storage.

It is a further object of the present invention to provide such a storage bin that can be completely cleaned out without the necessity of any poking or probing through the bottom or shaking of the bin.

It is a still further object of the present invention to provide such a storage bin that will be reliable and simple in design.

SUMMARY OF THE INVENTION

The present invention achieves the aforementioned objects by providing a longitudinally extending interior baffle in the bin, which baffle is adapted to divide the interior thereof into two longitudinally contiguous interior compartments. A lower portion of the baffle is pivotally supported within the bin along its upper edge. Means are provided to rotate such portion about its upper edge alternatively to position the same at least parallel to each of the bottom walls; that is, the lower portion is preferably rotated to positions slightly out of parallel to the bottom walls so as to provide alternate interior compartments having slightly negatively sloped sidewalls.

During the filling of the bin, the baffle is positioned at least parallel to one of the bottom walls to form a first longitudinally extending interior compartment having generally parallel sidewalls and a second such compartment contiguous to the first having nonparallel sidewalls. The first compartment is thus readily emptied when the gate is opened at the bottom of the bin.

After the first compartment has been emptied, the baffle is rotated to a second position at least parallel to the other bottom wall, thereby to permit the remaining chips in the bin readily to be emptied. The baffle is left in this second position, the gate is closed, and the bin is ready for the next cycle.

DESCRIPTION OF THE PREFERRED EMBODIMENT

Figure 1:
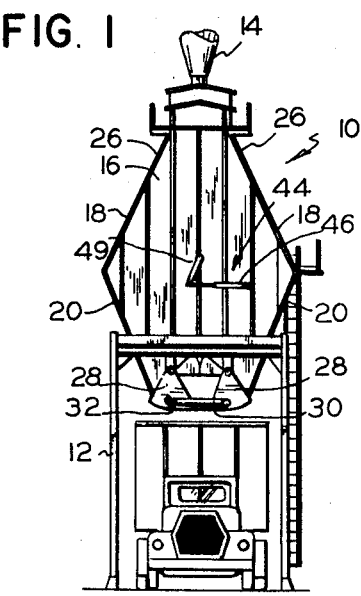
FIG. 1 is an end elevation of a storage bin made in accordance with the present invention.

Referring to the drawings the storage facility illustrated comprises a bin or hopper 10 supported on a frame 12 and fed through suitable means such as a pneumatic feed system including a cyclone separator 14. The bin is provided with a pair of parallel end walls 16 and sidewalls 18 which include a pair of opposite bottom walls 20 which converge inwardly toward each other in the downward direction. Each such wall 20 is inclined to the horizontal at an angle substantially greater than the angle of repose of the wood chips or other products to be handled in the bin. The walls 20 terminate along horizontal bottom edges 22 which define with the corresponding edges of the end walls 16 a rectangular bottom opening 24. The sidewalls 18 of the bin also comprise a pair of upper walls 26 which are contiguous along their lower edges with the upper edges of the bottom walls 20.

Figure 2:
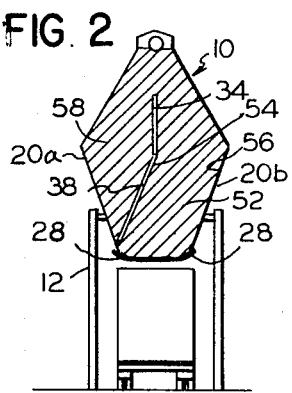
FIG. 2 is a schematic view similar to FIG. 1, showing the storage bin of the present invention filled with wood chips or similar materials.
Figure 3:
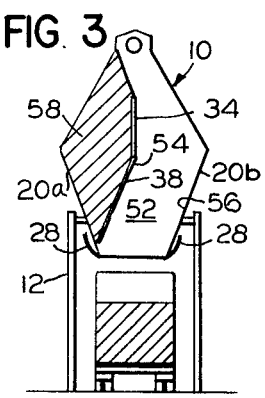
FIG. 3 is a view similar to FIG. 2 wherein the gates on the bin are opened allowing one side of the bin to be emptied.

The bin is provided with gate means for opening and closing the bottom opening 24 to permit discharge of the product. Such gate means preferably comprise a pair of gates 28 which are adapted to be moved from a closed position as shown in FIG. 2 in which they completely close the bottom opening 24, to the retracted position shown in FIGS. 3 and 4 in which they are withdrawn to one side of the opening so that the contents of the bin can fall therethrough. Connected to the gates 28 are a pair of double-acting hydraulic cylinder and piston means including a cylinder 30 and piston rod 32 which upon actuation open or close the gates 28.

A fixed baffle 34 is mounted within the bin 10 between the end walls 16, running the full length thereof. A hinged baffle 38 is pivotally supported at its upper edge 40 on a hinge rod 39 journaled in the end walls 16. The hinged baffle 38 is positioned immediately below the lower edge 42 of the fixed baffle 34 and has a length which permits approximately 2-inches clearance at each end of the bin.

Figure 6:
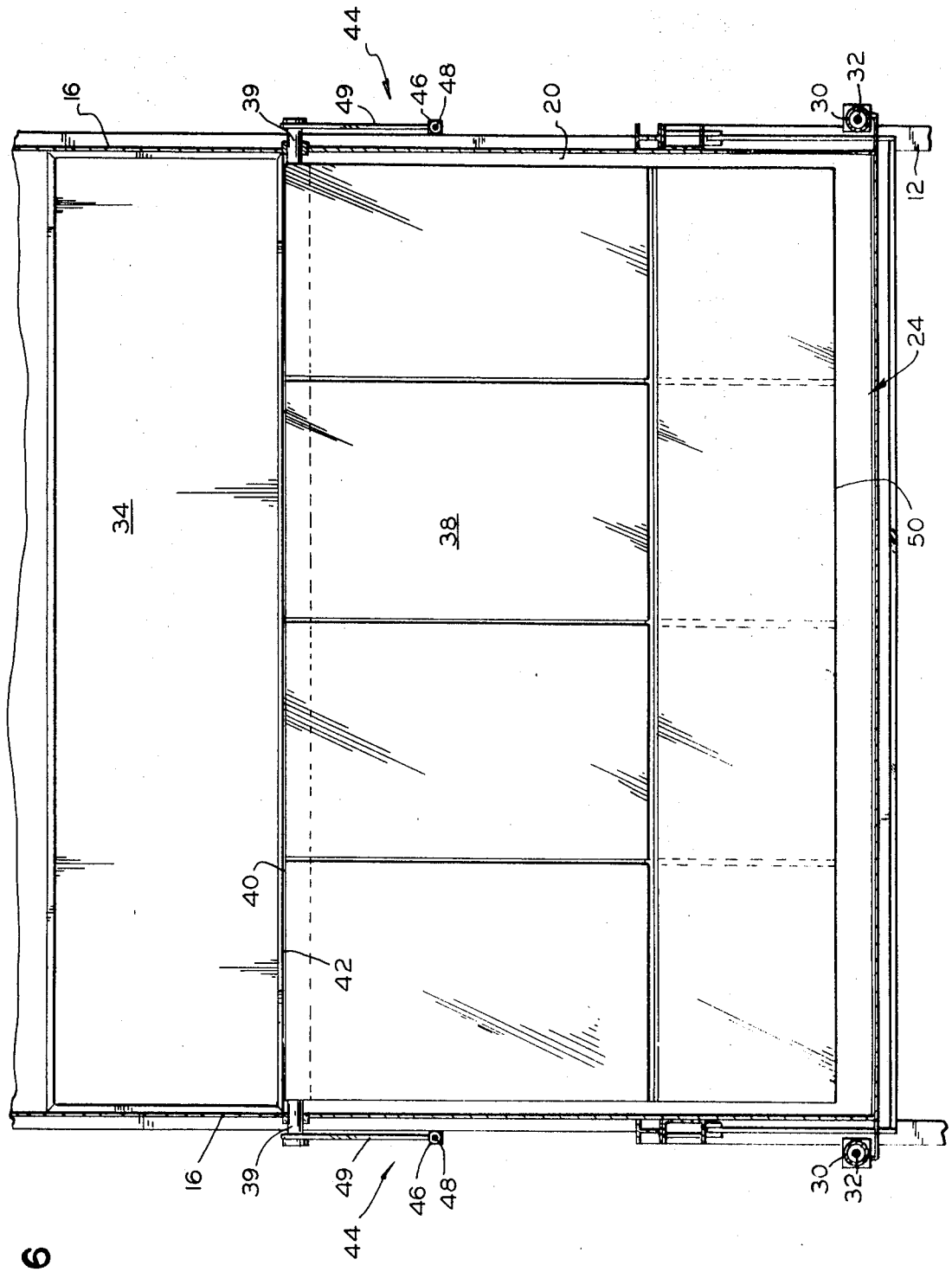
FIG. 6 is a sectional view taken on line 6—6 of FIG. 5.

A double-acting hydraulic cylinder and piston means 44 are positioned at each end of the bin 10 as shown in FIG. 6 to rotate the hinged baffle 38 on the rod 39. Each such means includes a cylinder 46 mounted on the outside of the respective end wall 16 and a piston rod 48 pivotally connected to a crank arm 49 attached to each end of the rod 39. Preferably the cylinders 46 and the cylinders 30 utilize the same power source.

Figure 5:
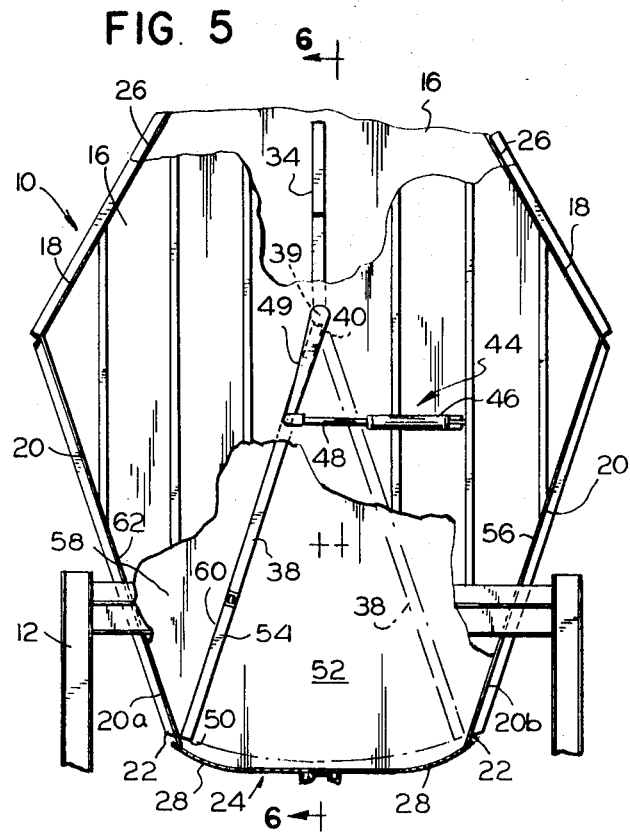
FIG. 5 is an end view to an enlarged scale of the storage bin of the present invention with parts broken away to show the construction thereof.

When the rods 48 are fully extended from the cylinders 46, the arms 49 rotate the hinged baffle 38 such that its lower edge 50 is in contact with one of the bottom walls 20a. See FIGS. 2 and 5. The baffle 38 is then positioned slightly out of parallel to the other bottom wall 20b such that a longitudinally extending interior compartment 52 is formed having sidewalls 54, 56 which are generally parallel to each other but preferably are negatively sloped, that is, diverging slightly in the downward direction. Obviously, positioning the hinged baffle 38 in this manner forms a second longitudinally extending contiguous interior compartment 58 having nonparallel sidewalls 60, 62.

The bin 10 is filled when the hinged baffle 38 is in position up against either of the bottom walls 20. Such a condition is illustrated for example in FIG. 2. When the gates 28 are opened, the thus-formed compartment 52 is readily emptied, the slight downward divergence of the sidewalls 54, 56 permitting complete discharge of the contents thereof without possibility of wedging or bridging between the walls 54, 56. See FIG. 3.

Figure 4:
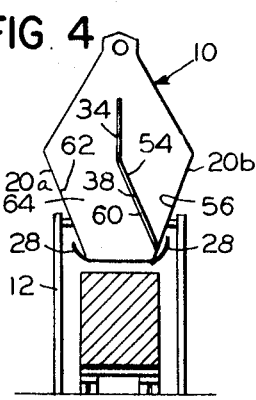
FIG. 4 is a view similar to FIGS. 2 and 3 wherein the baffle has been rotated to its second position, thereby allowing the remaining chips in the bin to be emptied.

The hinged baffle 38 is then rotated on the rod 39 by retracting the pistons 48 such that the lower edge 50 contacts the other bottom wall 20b. Again a compartment 64 is formed, as shown in FIG. 4, having sidewalls slightly out of parallel; that is, diverging slightly in the downward direction. The remaining chips in the bin are similarly discharged therefrom without any possibility of bridging thereacross. The hinged baffle 38 is then left in this position, the gates 28 are closed and the bin is ready for the next cycle.

I claim:

1. In a storage bin for wood chips or like product having sidewalls including a pair of opposite bottom walls inwardly converging in the downward direction, said bottom walls being inclined to the horizontal at an angle substantially greater than the angle of repose of the product and terminating short of their line of convergence to define a bottom opening in said bin, and gate means mounted below said opening and operable selectively to permit the product to pass therethrough, the improvement comprising:

a longitudinally extending interior baffle in said bin, said baffle being adapted to divide the interior of said bin into two longitudinally contiguous interior compartments;

means pivotally to support said baffle within said bin along its upper edge; and means to rotate said baffle about said upper edge alternatively to position the same at least parallel to each of said bottom walls, said baffle being positioned at least parallel to one of said bottom walls during the filling of said bin to form a first longitudinally extending interior compartment having generally parallel sidewalls and a second such compartment having nonparallel sidewalls contiguous to said first compartment, said first compartment being readily emptied when said gate means are opened, said baffle being positioned at least parallel to the other of said bottom walls after said first compartment has been emptied, thereby to permit said second compartment to be readily emptied.

2. The bin of claim 1 further comprising a fixed baffle mounted within said bin above said upper edge of said first-named baffle.

3. The bin of claim 1 in which said rotating means comprise hydraulic piston and cylinder means.

4. The bin of claim 1 in which said baffle is positioned medially of said bin and is of a length wherein the lower edge thereof contacts said bottom walls when rotated generally parallel thereto.

5. The bin of claim 4 in which said pivotally supporting means for said baffle is positioned with respect to said bin, and said baffle is of such length as to provide said first compartment with sidewalls diverging in the downward direction when said baffle is rotated to contact said one bottom wall.